FIG. II
MAGNETIZATION vs. TEMPERATURE CURVES OF COMPLEX ANTIMONIDES
EXAMPLE IX
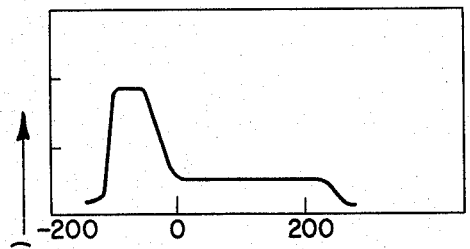
EXAMPLE XV
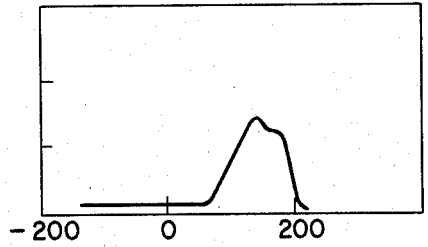
EXAMPLE XI
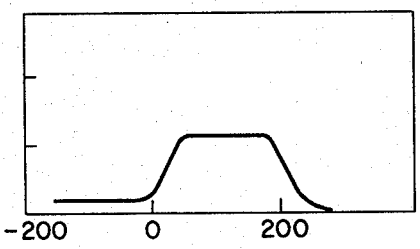
EXAMPLE XVIII
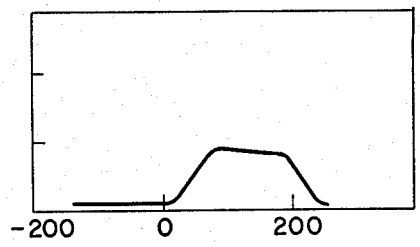
EXAMPLE XIII
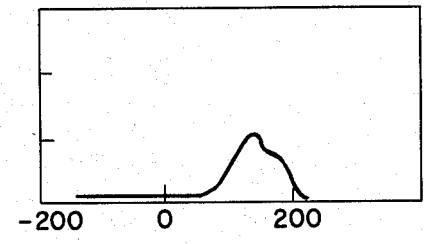
EXAMPLE XIX
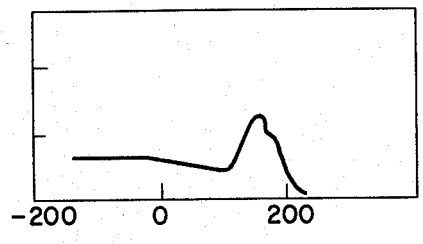
TEMPERATURE, °C →

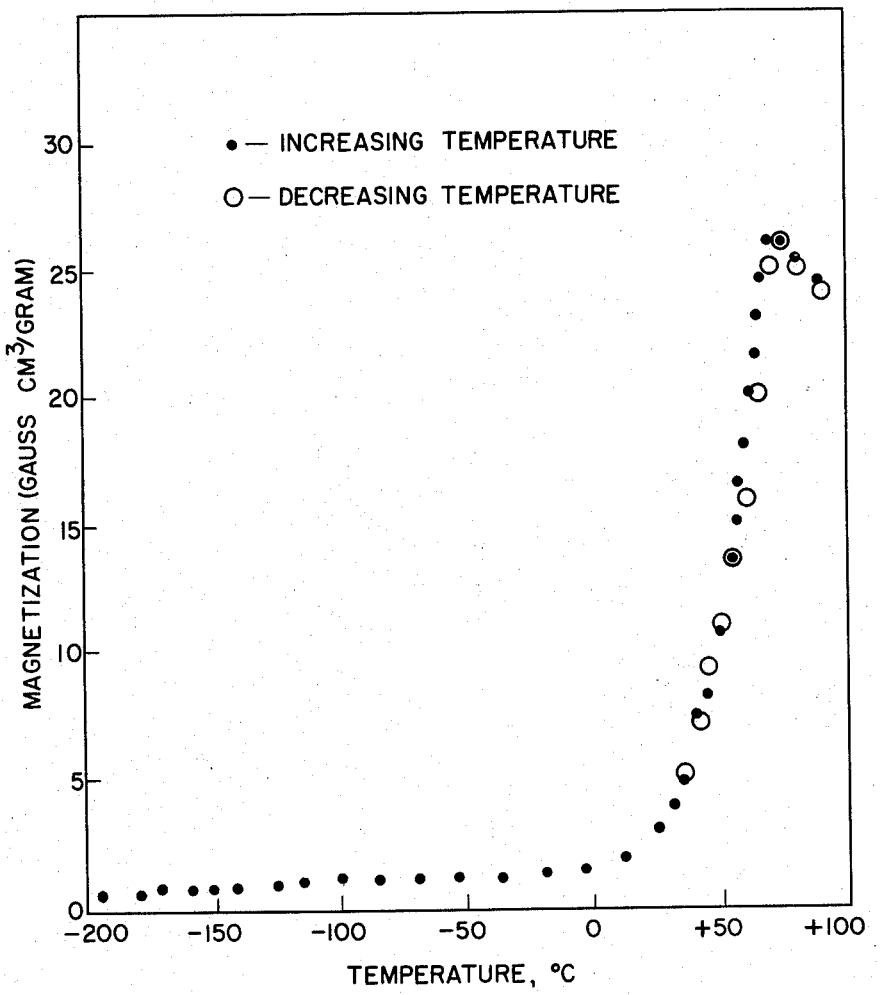

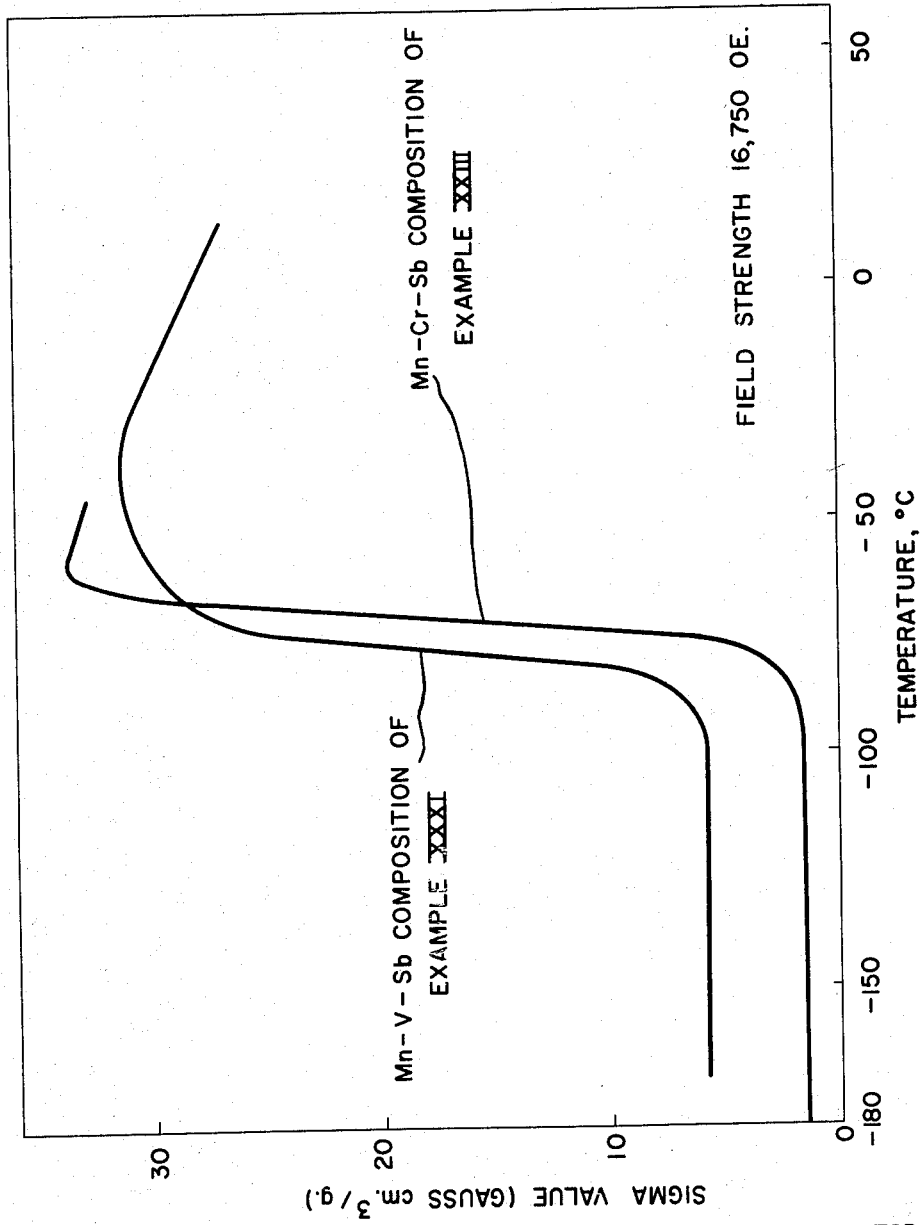

United States Patent Office 3,126,347
Patented Mar. 24, 1964

3,126,347
MAGNETIC ANTIMONIDES AND ARSENIDES
AND THEIR PREPARATION
Thomas J. Swoboda, Chester, Pa., assignor to E. I. du
Pont de Nemours and Company, Wilmington, Del., a
corporation of Delaware
Filed Mar. 22, 1962, Ser. No. 181,744
17 Claims. (Cl. 252—62.5)

This invention relates to ferromagnetic materials, especially materials useful in devices for the interconversion and control of various forms of energy, and to the preparation of such materials. More particularly, it relates to ferromagnetic compositions having a maximum saturation induction within a restricted temperature range and a very much smaller induction at temperatures both above and below this range. The invention is also directed to methods for preparing products exhibiting desirable magnetic properties.

This application is a continuation-in-part of my copending application Serial No. 776,098, filed November 24, 1958; 19,370, filed April 1, 1960, and 125,511, filed July 20, 1961, all of which have been abandoned.

The usual ferromagnetic materials, including those which have found wide technical application, are characterized by a magnetic response that decreases as temperature is increased and above a certain temperature, known as the Curie temperature, becomes that of a paramagnetic material. Materials of this type retain their ferromagnetic behavior down to very low temperatures, i.e., temperatures as low as the boiling point of liquid helium and below.

Such materials have been employed in devices whose operation involves transformation of energy from one form to another. Certain of these devices, such as the common household thermostat based upon a bi-metallic temperature responsive element, often employ a permanent magnet as an accessory to improve performance. In devices of another type, the magnetic element itself is primarily responsible for operation. Among such devices are the motor of Van der Maas and Purvis [Am. J. Phys., 24, 176 (1956)] and the thermoelectric generator of Schwarzkopf (U.S. 2,016,100). The mode of operation and manner of construction of such devices is influenced by the fact that for most ferromagnetic materials, saturation decreases monotonically with increasing temperature up to the Curie point. For example, in operation of the motor referred to above, heat sufficient to substantially increase the temperature of the rotor must be applied.

A few instances have been reported of materials in which the magnetic response increases with increasing temperature in a region below the Curie temperature. Examples of materials reported to show this behavior are the sulfides of chromium and iron. In the case of chromium sulfide, this increase in magnetic response occurs well below room temperature and in the case of iron sulfide, well above room temperature. The metal-sulfur ratio at which the effect is observed is extremely critical for both sulfides and, particularly for the iron sulfides, is dependent on prior thermal history of the sample. There is need for compositions which have a sharp increase in magnetic response with increasing temperature and in particular for compositions that have novel ferromagnetic transition temperatures of this kind which can be precisely controlled as well as for compositions with such ferromagnetic transition temperatures near room temperature.

Accordingly, it is an object of this invention to provide a new and versatile class of ferromagnetic compositions. Another object is to provide ferromagnetic compositions which exhibit a maximum saturation induction in a restricted range of temperature and a much lower saturation induction at temperatures both above and below this range. A further object is to provide processes for preparing such ferromagnetic compositions.

These and other objects of this invention are obtained by providing ferromagnetic compositions containing at least two transition elements selected from groups V–B, VI–B and VII–B of the periodic table, of which at least one is taken from the first row of said transition elements, and at least one element of group V–A selected from As and Sb.

Many compositions are characterized by having a pronounced increase in saturation induction at a temperature above 0° K. but below the Curie point of the composition. The unusual dependence of magnetization on temperature exhibited by such compositions of this invention is believed to result from a transition from an antiferromagnetic state to a ferromagnetic state with rise in temperature. At the transition temperature, sometimes referred to as the lower transition temperature to differentiate from the upper transition, or Curie temperature, the total quantum mechanical exchange between adjacent sublattices is believed to change sign and it is this exchange inversion which is presumed to be at the basis of the observed change in magnetic properties.

For better understanding of the present invention, together with other and further objects thereof, reference is made to the following detailed description taken in connection with the accompanying drawings, in which:

FIG. I is a typical magnetization-temperature plot for a preferred composition of this invention.

FIG. II is a series of magnetization-temperature curves for several preferred compositions of the invention.

FIG. III is a magnetization-temperature plot for two additional compositions.

COMPOSITIONS

In the compositions of this invention, said group V–A element(s) constitutes 5–40 atom percent of the whole and will generally be in the range of 5 to 35 atom percent. It will be understood that at least one group V–A element of the group consisting of arsenic and antimony, is always present in the novel compositions. Nitrogen, phosphorus, and bismuth may also be present. Of the remaining components, the transition metals of groups V–B, VI–B and VII–B of the periodic table, i.e., at least two of V, Cr, Mn, Nb, Mo, Ta, W and Re, of which at least one is selected from V, Cr, and Mn, constitute from 35 to 95 atom percent, any other element present being a metal from groups II–IV of the periodic table in an amount of not more than 30 atom percent. Suitable examples of such other elements are cadmium, gallium, indium, lead, thallium, tin, zirconium, scandium, yttrium, magnesium and zinc. Ordinarily one of the transition metals enumerated above will constitute the major proportion of the transition metal content of the composition while the second transition metal will be present in minor proportion. However, the content of the second transition metal will in no case be less than 0.1 atom percent, and is preferably at least 0.5 atom percent, based on the total composition.

The periodic table referred to herein is the one appearing in Deming's "General Chemistry," John Wiley & Sons, Inc., 5th Ed., chap. 11.

Preferred compositions which possess the unusual magnetic properties described above to an outstanding degree, contain antimony, manganese and at least one additional transition metal, particularly chromium, vanadium, molybdenum or niobium, and optionally one or more additional elements selected from the group consisting of bismuth, indium, cadmium, lead, zirconium, tin, gallium, thallium, scandium, yttrium, magnesium and zinc.

Examples of preferred compositions are those containing antimony, 5–40 atom percent; manganese, 35–91.9 atom percent; at least one element of the group chromium and vanadium, 0.1–38.5 atom percent; and optionally an element of the group bismuth, cadmium, gallium, indium, lead, thallium, tin, zirconium, scandium, yttrium, magnesium and zinc, 0–30 atom percent, the percentage values being so chosen as to total 100%.

Other preferred compositions contain antimony, 5–35 atom percent, manganese, 25–75 atom percent, at least one element of the group molybdenum and niobium, 0.1–50 atom percent, and optionally an element of the group bismuth, cadfium, gallium, indium, lead, thallium, tin, zirconium, scandium, yttrium, magnesium, and zinc, 0–30 atom percent.

The foregoing novel compositions can be described by the formula $Mn_aX_bZ_cSb_d$, where X is chromium, vanadium, molybdenum, or niobium; Z is bismuth, indium, cadmium, gallium, lead, thallium, tin, zirconium, scandium, yttrium, magnesium, or zinc; and $a$, $b$, $c$, and $d$ are the atomic proportions of the elements employed and are chosen so as to provide percentage compositions in the ranges stated above. Compositions, in which X and/or Z represent a combination of two or more elements, can also be prepared and possess desirable ferromagnetic properties.

Particularly useful compositions are those containing 53.5–91.9 atom percent manganese, 8–35 atom percent antimony, and 0.1–38.5 atom percent of an additional element of the group chromium, vanadium and mixtures thereof. These compositions can be described by the formula $Mn_aX_bSb_d$, where X is chromium and/or vanadium, and $a$, $b$, and $d$ are the above-indicated atomic proportions of the elements, $a$, $b$, and $d$ totalling 1. Preferred compositions have the formula $Mn_{2-x}X_xSb$, where $x$ is 0.033–0.41, or more especially 0.015–0.25, it being understood that the sum of the subscripts to Mn, X and Sb is 3.

Other useful compositions are those containing antimony, 5–35 atom percent; manganese, 35–70 atom percent; at least one element of the group chromium and vanadium, 0.8–25 atom percent; and an element of the group bismuth, cadmium, gallium, indium, lead, thallium, tin, zirconium, scandium, yttrium, magnesium, and zinc, 0–30 atom percent, the percentage values being so chosen as to total 100%.

Further compositions of this invention are manganese-rhenium arsenide, manganese niobium antimonide, manganese tungsten arsenide, manganese chomium molybdenum antimonide, manganese tantalum arsenide, manganese chromium antimony bismuthide, and manganese chromium antimony nitride.

CRYSTAL STRUCTURE

Many novel compositions of this invention containing chromium and/or vanadium exhibit a tetragonal crystal structure of the $Cu_2Sb$-type and this structure may be one of the factors contributing to their unusual ferromagnetic behavior. Manganese antimonide ($Mn_2Sb$), however, which also posessses this structure, does not exhibit these unusual magnetic properties. Compositions containing niobium which exhibit exchange inversion give a complex X-ray pattern which has not been fully elucidated. No change in crystal symmetry is observed by X-ray diffraction when the compositions of this invention are heated or cooled through the exchange inversion temperature.

Although the tetragonal structure may constitute the principal component of a product of this invention, other structures, such as MnSb and unreacted ingredients, may also be present. It is desirable for many applications that such impurity structures be substantially absent, however. Of course, for certain uses such a tetragonal composition will be combined with other substances, e.g., plastics or substances having conventional magnetic properties, to achieve a desired result. For example, by combination with a magnetic substance exhibiting conventional dependence of magnetic properties on temperature, composite materials with highly novel magnetic behavior can be obtained.

MAGNETIC TRANSITION

These composition often exhibit lower ferromagnetic transition, i.e., exchange inversion temperatures above $-150°$ C. and for many practical applications, those having a lower transition temperature near room temperature, i.e., from about $-50°$ to $+75°$ C. are especially useful. However, compositions having very low exchange inversion temperature, i.e., considerably below the boiling point of liquid nitrogen, can also be prepared and are useful in devices operating at such temperatures. The upper ferromagnetic transition temperature, i.e., Curie point, is usually in the range of $180°$ C., and above.

For compositions having an exchange inversion above about $-70°$ C. in zero or very low magnetic field, a direct transition from a ferrimagnetic state to an antiferromagnetic state occurs on cooling. Compositions having an exchange inversion at a lower temperature, however, have been found by applicant's assignee to exhibit an intermediate state and at sufficiently low temperatures, i.e., below about $-170°$ C., only the transition between the ferrimagnetic state and this intermediate state is observed. All transitions among the three states are first order transitions. Although the nature of the intermediate state is not fully understood, the magnetic structure in this state differs from the structure in the antiferromagnetic and the ferrimagnetic states referred to above.

It is desirable for certain practical applications that the low temperature magnetic transition or exchange inversion occur over a small temperature interval and produce a large change in saturation induction. Both the temperature interval and the extent of change in saturation induction are susceptible to modification by changes in composition of the magnetic phase. The change in saturation induction often provides a simple criterion of product quality. Compositions of good quality exhibit a saturation induction below the exchange inversion temperature which is no more than about ⅕ and preferably no more than ⅒ of the maximum saturation induction above this temperature. Stated in another way, the ratio of the maximum saturation induction to the saturation induction below the exchange inversion temperature is at least 10:1 for preferred compositions.

For a given composition, the range of temperature over which the lower ferromagnetic transition occurs can readily be minimized by preparing the material in single crystal form. Single crystals undergo extremely rapid changes in saturation induction as the temperature is varied in the region of the low temperature transition point. Alternatively, the temperature range can be minimized by quenching and annealing the composition as described by W. W. Gilbert in application Serial No. 120,679, filed June 29, 1961.

The specific manner in which saturation induction varies with temperature can be controlled by changing the composition of the ferromagnetic product. For example, the lower ferromagnetic transition temperature of chromium-indium-manganese antimonide can be varied from $-130°$ C. to $+75°$ C. by employing proportions of the elements represented by the formula $Mn_{8-x}Cr_xInSb_3$, where $x$ is from 0.1–2.0 (i.e., compositions containing manganese, 50.0–65.8 atom percent; chromium, 0.8–16.7 atom percent; indium, 8.3 atom percent; and antimony, 25 atom percent). At the same time, the upper ferromagnetic transition temperature, i.e., the Curie point, varies from 268 to 208° C.

PREPARATIVE PROCESSES

These novel ferromagnetic compositions are prepared by heating mixtures containing the elements in the desired proportions to a temperature in the range above 600° C. Temperatures of at least 850° C. are generally necessary if the composition is to be melted. For the preparation of manganese chromium and manganese vanadium antimonides, temperatures of 600°–1050° C., or preferably 700–975° C. are employed, while higher temperatures up to about 1500° C. are often used when second and third row transition metals are present. At the higher temperatures, volatilization of high vapor pressure reactants may become a problem, requiring the reaction to be conducted in a sealed container.

The time of heating is not critical but should be sufficient to permit complete reaction of the ingredients. In the examples below, heating times ranging up to about 50 hours are employed. However, longer times may be useful in some cases such as in the preparation of the compositions in single crystal form.

Heating may be carried out at atmospheric pressure with the reactants protected by a blanket of inert gas such as helium or argon. Alternatively, the reaction may be conducted in an evacuated vessel. It is also possible to employ superatmospheric pressures. Small batches of product may be readily prepared by placing the ingredients in a quartz tube which is then evacuated and sealed. In this case, the reaction is carried out under the autogenous pressure developed by the reaction mixture at the reaction temperature.

The materials employed in preparing ferromagnetic compositions of this invention can be the elements themselves or any of the binary or ternary combinations thereof, such as manganese antimonide, chromium antimonide, manganese-chromium antimonide, indium-manganese alloy, etc. It is preferred that the materials be in powder or granular form and that they be well mixed before heating is commenced.

Reaction apparently begins at about 400° C. and continues as the temperature is increased. Of course, when indium is present in the reaction mixture, it usually melts (M.P. 156° C.) at an early stage of the heating. In spite of the fact that the melting point of antimony is 630° C., no evidence of melting at this temperature is observed. As the temperature is increased further, fusion of the mixture takes place in the range about 850° C. After the desired heating cycle is completed, the reaction mixture is cooled rapidly or the product may be annealed by slow cooling.

PURIFICATION

The product may be subjected to purification, e.g., by extraction with acids to remove uncombined metals, or by magnetic separation to remove non-magnetic components or components which are magnetic but do not exhibit an exchange inversion. Purification is preferably preceded by grinding to small particle size to improve the efficiency of the purification processes. It is important that the temperature at which magnetic separation is carried out be carefully controlled. Separations for the removal of magnetic from non-magnetic components are carried out at a temperature below the Curie temperature of the magnetic phase. A temperature near the temperature of maximum magnetization is preferable with inversion materials. Under these conditions the desired product is retained by the magnetic field of the separator. On the other hand, separation of a magnetic material and a material having exchange inversion is carried out at a temperature below the exchange inversion temperature such that the magnetic material is retained by the field while the exchange inversion material is unaffected thereby.

Magnetic separation is also effective as a method for reducing the temperature interval over which exchange inversion occurs. For this purpose, separations are carried out at two or more closely spaced temperatures within the inversion range. The interval between the temperatures selected determines the temperature range over which exchange inversion occurs for material which is substantially nonmagnetic at the lower temperature and magnetic at the higher temperature.

PHYSICAL PROPERTIES

The novel ferromagnetic compositions of this invention exhibit several magnetic characteristics which make them especially valuable for use in various specific applications. The novel lower ferromagnetic transition temperature is a distinguishing feature conferring unusual utility on many materials. This temperature is determined in the same manner used for the determination of ordinary Curie temperatures, i.e., by the measurement of magnetic response as a function of temperature. It will, of course, be necessary in some instances to modify the usual equipment to the extent of providing means for cooling the sample in addition to the usual heating means. A rapid method for determining qualitatively whether a product, which is magnetic at room temperature, possesses a low temperature magnetic transition point is to observe its magnetic behavior upon cooling to a low temperature such as that of liquid nitrogen or liquid helium.

Other critical magnetic properties which are important to the technical utility of these materials are the intrinsic coercive force, $H_{ci}$, and the saturation per gram or sigma value, $\sigma_s$. The definition of intrinsic coercive force is given in special technical publication No. 85 of the American Society for Testing Materials, entitled "Symposium on Magnetic Testing" (1948), pp. 191–198. The values for the intrinsic coercive force given herein are determined on a D.C. ballistic-type apparatus, which is a modified form of the apparatus described by Davis and Hartenheim in the Review of Scientific Instruments 7, 147 (1936). The sigma value, $\sigma_s$, is defined on pages 7 and 8 of Bozorth's "Ferromagnetism," Van Nostrand Co., New York, 1951. This sigma value is equal to the intensity of magnetization, $I_s$, divided by the density, $d$, of the material. The sigma values given herein are determined (a) on apparatus similar to that described by T. R. Bardell on pp. 226–228 of "Magnetic Materials in the Electric Industry," Philosophical Library, New York, 1955; or (b) in a field of 16,750 oersteds using the Faraday-Curie method (Bozorth, ibid, pp. 858–859). Method (a) was employed in Examples I–XVIII below and method (b) in Examples XIX–XXXVIII. Although exchange inversion temperature is somewhat affected by field strength, smaller fields, e.g., fields of 100–1000 oersteds, can be employed in approximate determinations of this temperature.

Many manganese-chromium and manganese-vanadium antimonides of this invention which may optionally contain additional elements, e.g., indium, exhibit cleavage planes perpendicular to the c-axis and have Curie temperatures usually in the range of 180–300° C. The compositions ordinarily melt at about 900° C. or above, and have densities in the range of 7.0–7.2 g./cc. at room temperature. Some compositions exhibit thermal hysteresis in exchange inversion, i.e., the inversion occurs at a higher temperature when approached from a temperature below the inversion than when approached from a temperature above the inversion. This hysteresis, which ranges from less than 1° in low hysteresis materials to as much as 20° C. or more in some products, may be desirable under certain circumstances. However, if temperature hysteresis is of sufficient magnitude to interfere with proper utilization of a composition, hysteresis can usually be reduced to acceptable levels by an increase in applied magnetic field at an appropriate stage in the hysteresis cycle. Other properties of certain manganese-chromium and manganese-vanadium antimonides are tabulated below.

*Properties of Manganese-Chromium and Manganese-Vanadium Antimonides*

| Property [a] | Value | T, °K. |
|---|---|---|
| Young's Modulus (single crystal; Mn, 65.2%; Cr, 1.5%; Sb, 33.3%): | | |
| a-axis, AF | $14.5 \times 10^{11}$ dynes/cm.$^2$ | 115 |
| F | $13.3 \times 10^{11}$ dynes/cm.$^2$ | 130–300 |
| Shear Modulus (polycrystalline; Mn, 63.4%; Cr, 3.3%; Sb, 33.3%): | | |
| AF | $2.85 \times 10^{11}$ dynes/cm.$^2$ | 307 |
| F | $3.03 \times 10^{11}$ dynes/cm.$^2$ | 307 |
| Coefficient of Linear Expansion (Mn, 62.7–66.0%; Cr, 0.6–4.0%; Sb, 31.6–33.3%; In, 0–1.7%): | | |
| a-axis, AF | $10 \times 10^{-6}$ °C.$^{-1}$ | 100 |
| | $13 \times 10^{-6}$ °C.$^{-1}$ | 200 |
| | $15 \times 10^{-6}$ °C.$^{-1}$ | 300 |
| F | $30 \times 10^{-6}$ °C.$^{-1}$ | 150 |
| | $29 \times 10^{-6}$ °C.$^{-1}$ | 200 |
| | $26 \times 10^{-6}$ °C.$^{-1}$ | 300 |
| c-axis, AF | $20 \times 10^{-6}$ °C.$^{-1}$ | 100 |
| | $33 \times 10^{-6}$ °C.$^{-1}$ | 200 |
| | $43 \times 10^{-6}$ °C.$^{-1}$ | 300 |
| F | $11 \times 10^{-6}$ °C.$^{-1}$ | 200 |
| | $22 \times 10^{-6}$ °C.$^{-1}$ | 300 |
| Expansion at Transition (Mn, 62.7–66.0%; Cr, 0.6–4.0%; Sb, 31.6–33.3%; In, 0–1.7%): | | |
| a-axis | −0.28% | 150 |
| | −0.20% | 200 |
| | −0.095% | 300 |
| c-axis | 0.51% | 150 |
| | 0.43% | 200 |
| | 0.26% | 300 |
| Hydrostatic Pressure Coefficient [b] (Mn, 62.7–64.6%; Cr, 2.8–4.2%; Sb, 30.9–33.1%; In, 0–1.7%). | 8,300 p.s.i./° C | 275 |
| | 7,500 p.s.i./° C | 300 |
| | 5,700 p.s.i./° C | 350 |
| Permeability—Field Parallel to c-axis (Mn, 63.4%; Cr, 3.3%; Sb, 33.3%; $T_t=303°$ K.): | | |
| Field— | | |
| 100 oersteds | 15 gauss/oersted | 318 |
| 200 oersteds | 10 gauss/oersted | 318 |
| 500 oersteds | 5 gauss/oersted | 318 |
| 1,000 oersteds | 3 gauss/oersted | 318 |
| 2,000 oersteds | 2 gauss/oersted | 318 |
| 5,000 oersteds | 1.4 gauss/oersted | 318 |
| Field Perpendicular to c-axis (Mn, 64.2%; V, 2.5%; Sb, 33.3%; $T_t=170°$ K.) | | |
| Field— | | |
| 1,500 oersteds | 1.33 gauss/oersted | 293 |
| 2,000 oersteds | 1.36 gauss/oersted | 293 |
| 3,000 oersteds | 1.35 gauss/oersted | 293 |
| 5,000 oersteds | 1.32 gauss/oersted | 293 |
| 20,000 oersteds | 1.11 gauss/oersted | 293 |
| Saturation Magnetization,[c] $\sigma_s$ (Mn, 62.3–65.0%; Cr, 1.7–4.4%; Sb, 33.3%). | 39 gauss cm.$^3$/g | 100 |
| | 34 gauss cm.$^3$/g | 200 |
| | 25 gauss cm.$^3$/g | 300 |
| | 13 gauss cm.$^3$/g | 400 |
| Magnetic Field Coefficient [d] (Mn, 62.7–65.2%; Cr, 0.7–4.2%; Sb, 30.9–33.3%; In, 0–1.7%). | −1,100 oersteds/° C | 100 |
| | −2,200 oersteds/° C | 200 |
| | −2,700 oersteds/° C | 300 |
| | −1,500 oersteds/° C | 400 |
| Residual Induction [e] (Mn, 63.4%; Cr, 3.3%; Sb, 33.3%): | | |
| After removal of saturating field | 1,600 gauss | 300 |
| After removal of saturating field and thermally cycling to AF state and back. | 300 gauss | 300 |

*Properties of Manganese-Chromium and Manganese-Vanadium Antimonides*

| Property [a] | Value | T, °K. |
|---|---|---|
| Electrical Restivity (Mn, 64.6–66.4%; Cr, 0.3–2.9%; Sb, 30.9–33.3%; In, 0–1.7%): | | |
| AF | $35 \times 10^{-6}$ ohm-cm | 4 |
| | $95 \times 10^{-6}$ ohm-cm | 50 |
| | $175 \times 10^{-6}$ ohm-cm | 100 |
| | $265 \times 10^{-6}$ ohm-cm | 200 |
| | $305 \times 10^{-6}$ ohm-cm | 300 |
| F | $5 \times 10^{-6}$ ohm-cm | 4 |
| | $20 \times 10^{-6}$ ohm-cm | 50 |
| | $50 \times 10^{-6}$ ohm-cm | 100 |
| | $135 \times 10^{-6}$ ohm-cm | 200 |
| | $210 \times 10^{-6}$ ohm-cm | 300 |
| | $265 \times 10^{-6}$ ohm-cm | 400 |
| I | $25 \times 10^{-6}$ ohm-cm | 4 |
| | $65 \times 10^{-6}$ ohm-cm | 50 |
| | $125 \times 10^{-6}$ ohm-cm | 100 |
| Thermoelectric Power Versus Cu (Mn, 65.0–65.9%; Cr, 0.8–1.7%; Sb, 33.3%; $T_t$ below 210° K.). | 7 to $8 \times 10^{-6}$ volt/° C | 300 |
| Thermal Conductivity (Mn, 64.6%; Cr, 2.9%; Sb, 30.9%; In, 1.6%): | | |
| AF | 0.059 watts/cm. ° C | 208 |
| AF | 0.049 watts/cm. ° C | 273 |
| F | 0.060 watts/cm. ° C | 303 |
| Heat Capacity at Constant Pressure (Mn, 64.3–65.2%; Cr, 1.5–3.3%; Sb, 31.6–33.3%; In, 0–1.7%). | 13.2 cal./mole ° C | 100 |
| | 19.4 cal./mole ° C | 200 |
| | 22.0 cal./mole ° C | 300 |
| Transition Entropy [f] (Mn, 62.7–65.2%; Cr, 0.7–4.2%; Sb, 30.9–33.3%; In, 0–1.7%). | 0.35 cal./mole ° C | 150 |
| | 0.40 cal./mole ° C | 200 |
| | 0.31 cal./mole ° C | 300 |
| | 0.11 cal./mole ° C | 400 |

[a] Composition used in preparing samples for measurement is shown in parentheses.
 AF = antiferromagnetic state.
 F = ferrimagnetic state
 I = intermediate state
 $T_t$ = exchange inversion temperature
[b] Change in pressure per degree change in transition temperature at constant field
[c] With sample in ferrimagnetic state, corrected for residual magnetization observed at temperatures below exchange inversion temperature Method (b)
[d] Change in field per degree change in transition temperature at constant pressure.
[e] See Bozorth, loc. cit., pages 4 and 5.
[f] Calculated by the Clausius-Clapeyron relation from field coefficient and change in magnetization at exchange inversion. Calculated values agree with values determined by direct calorimetric measurement.

The compositions of this invention are illustrated further by the examples below in which the proportions of ingredients are expressed in parts by weight unless otherwise noted.

EXAMPLE I

A. An intimate mixture of manganese, chromium, indium and antimony (atom percent, respectively, 55.5, 11.1, 16.7, 16.7) in finely divided form was placed in a quartz tube which was then evacuated and sealed. The tube was placed in a furnace at 910° C. and maintained at this temperature for 22 hours. The quartz tube was then removed from the furnace, cooled rapidly in air and opened. The product was a metallic appearing slug which exhibited maximum saturation induction at 62° C. with upper (Curie point) and lower ferromagnetic transition temperatures at 238° and −20° C., respectively.

For purification, a portion of the slug was ground in an agate mortar and treated with two changes of 20% aqueous tartaric acid followed by treatment with a solution of 0.5% (by weight) picric acid and 3% (by volume) concentrated hydrochloric acid in absolute ethanol. After each of these treatments, the dried solid was agitated in a magnetic field to separate magnetic from nonmagnetic material. The purified product gave an X-ray pattern as follows (after subtraction of weak reflections caused by the presence of traces of antimony, indium and indium antimonide).

Interplanar spacings are expressed in angstrom (A.) units. Relative intensities are indicated as follows: S designates the strongest line recorded; $M_1$, $M_2$, $M_3$ and $M_4$ are medium intensity lines of successively decreasing intensity; F means that the line is faint; VF and VVF mean very faint and extremely faint, respectively.

X-Ray Pattern of Chromium-Indium-Manganese Antimonide

| Interplanar Spacings | Relative Intensities | Interplanar Spacings | Relative Intensities |
|---|---|---|---|
| 6.5 | VVF | 1.443 | $M_4$ |
| 3.46 | $M_2$ | 1.420 | VVF |
| 3.26 | $M_4$ | 1.398 | F |
| 2.89 | $M_2$ | 1.331 | VVF |
| 2.64 | $M_3$ | 1.320 | F |
| 2.16 | S | 1.290 | VF |
| 2.04 | $M_1$ | 1.273 | $M_4$ |
| 1.954 | VVF | 1.265 | VVF |
| 1.921 | VF | 1.242 | VVF |
| 1.757 | F | 1.216 | VVF |
| 1.729 | F | 1.200 | $M_2$ |
| 1.630 | VF | 1.190 | $M_4$ |
| 1.486 | $M_4$ | | |

A tetragonal structure of the $Cu_2Sb$-type having cell constants of $a_0$, 4.08 A.; and $c_0$, 6.51 A. is consistent with these data.

B. A second sample was prepared as described above, using a heating cycle of 20 hours at 920–925° C. This sample exhibited maximum saturation induction at 58° C. and a Curie temperature of 243–246° C. After purification by extraction in turn with picric acid-concentrated hydrochloric acid in ethanol and with 5% aqueous sulfuric acid, and by magnetic separations, magnetic properties were determined in a field of 2000 oersteds. Saturation per gram, $\sigma_s$, at 65° C. was in excess of 20 gauss cm.$^3$/g. Intrinsic coercive force, $H_{ci}$, was 127 oersteds at 2.5° C. and 166 oersteds at 31° C. Chemical analysis of the purified product gave the following results (expressed in weight percent); Sb, 41.47; In, 14.01; Mn, 38.70; and Cr, 0.84, 0.89. This analysis corresponds to $Mn_{1.53}$, $Cr_{0.40}$, $In_{0.26}$, $Sb_{0.74}$. Other elements shown to be present were O (by direct analysis), 1.49%; Pb, 0.2–1.0%; Sn, 0.2–1.0%; Cu, 200–1000 p.p.m.; Ni, 300–500 p.p.m.; and Si, 100–500 p.p.m.

C. A third preparation was carried out, using a heating cycle of 6 hours at 800–820° C. Single crystals were isolated by cleaving them from the product slug recovered from the reaction. These crystals exhibited maximum saturation induction at 70° C. and had a saturation per gram, $\sigma_s$, at this temperature of 26 gauss cm.$^3$/g. when measured in a field of 14,400 oersteds (see FIGURE I). The magnetization in the above field versus temperature was the same whether the crystals were oriented with the cleavage planes perpendicular or parallel to the field and showed no thermal hysteresis. The change of magnetization with temperature in the region of the lower ferromagnetic transition temperature was very rapid.

EXAMPLES II AND III

These examples illustrate the preparation of magnetic products exhibiting a lower ferromagnetic transition temperature composed of manganese, indium, antimony, and at least one metal of the group consisting of vanadium, and chromium. The procedure employed in Example II is described in detail below in connection with Examples VIII–XIII; the procedure in Example III was like that of Example I. Details of the preparation and properties of the products are summarized in Table I. The products possess a tetragonal structure of the $Cu_2Sb$-type as indicated by X-ray analysis.

Table I $Mn_aX_bIn_cSb_d$

| Example No. | Reactants (atom percent), Mn/X/In/Sb | Heating Time (hrs.) [a] | Magnetic Properties [b] | |
|---|---|---|---|---|
| | | | $T_c$ (° C.) | $T_{max}$ (° C.) |
| II | X=V 63.4/3.3/1.7/31.6 | 19 | 265 | −66. |
| III | X=V 55.5/11.1/16.7/16.7 | 22 | 240–246 | Below 0° C. |

[a] Temperatures of 900–950° C. were employed.
[b] $T_c$ is Curie point; $T_{max}$ is temperature of maximum magnetic response.

EXAMPLES IV–VII–C

Preparation of magnetic products exhibiting two ferromagnetic transition temperatures and composed of manganese, chromium, antimony, and a metal of the group consisting of cadmium, lead, thallium, zirconium, scandium, yttrium and zinc is illustrated by these examples. The general procedure was as in Example I. Details of preparation and properties of the products are shown in Table II. The products exhibit X-ray diffraction patterns indicative of a tetragonal structure of the $Cu_2Sb$-type.

Table II $Mn_aCr_bZ_cSb_d$

| Example No. | Reactants [a] Mn/Cr/Z/Sb | Heating Time (hrs.) [b] | Magnetic Properties [c] | |
|---|---|---|---|---|
| | | | $T_c$ (° C.) | $T_{max}$ (° C.) |
| IV | Z=Cd | [d] 20 | 252 | 46 |
| V | Z=Pb | 4 | 248 | 56 |
| VI | Z=Zr | 22 | 246 | 44 |
| VII | Z=Tl [e] | 20 | 205 | 135 |
| VII–A | Z=Sc [f] | 19.5 | 242 | 70 |
| VII–B | Z=Y [f] | 19.5 | 246 | 70 |
| VII–C | Z=Zn [f] | 2.8 | 270 | 55 |

[a] Atom percent: Mn, 50.0; Cr, 16.7; Z, 16.7; Sb, 16.7.
[b] Temperatures of 900–965° C. were employed.
[c] $T_c$ is Curie point; $T_{max}$ is temperature of maximum magnetic response.
[d] Sample was quenched in air, others were cooled slowly.
[e] Atom percent: Mn, 60.0; Cr, 6.7; Tl, 1.7; Sb, 31.7. Heating carried out in argon atmosphere.
[f] Atom percent: Mn, 63.3; Cr, 3.3; Z, 1.7; Sb, 31.7. Heating carried out in argon atmosphere.

EXAMPLES VIII–XIII

These examples illustrate the preparation of compositions from mixtures containing Mn, 50.0–66.7 atom percent; Cr, 0–16.7 atom percent; In, 8.3 atom percent; Sb, 25 atom percent. These may be represented by the formula $Mn_{8-x}Cr_x InSb_3$, where $x$ has values in the range of 0 to 2. It will be noted that the composition containing no chromium is not a part of the present invention and does not show a low temperature ferromagnetic transition.

In these examples a well blended mixture of powdered manganese, antimony and chromium plus small pieces of indium in the desired proportions was compressed into a cylindrical rod which was placed in a quartz tube. This tube was mounted vertically in a furnace with the upper end of the tube projecting out of the furnace. The upper end was attached to a manifold so that the sample could be evacuated with an oil pump or maintained under an atmosphere of argon as desired. The tube was successively evacuated and flushed with argon during approximately one hour while the temperature was raised to about 400° C. The sample was thereafter maintained under an atmosphere of argon while the temperature was raised during a 1 to 2 hour period to a maximum of 925–975° C. at which temperature the sample was molten. The temperature was maintained for approximately 19 to 21 hours and the sample was then slowly cooled to room temperature over a period of about 10 hours. The product, after removal from the quartz tube, was a metallic slug which, when fractured, revealed a crystalline interior. The crystals were plate-like in appearance and had a very high, silvery luster. Purification was carried out as described above by extraction with picric acid-concentrated hydrochloric acid in ethanol and with 6% sulfuric acid combined with magnetic separation. Details of the reactants employed and the properties of the resulting products are shown in Table III. The magnetic properties of representative products are illustrated in FIG. II. These products gave X-ray patterns indicating a structure corresponding to that described in Example I–A.

Table III $Cr_xMn_{8-x}InSb_3$ $(0 \leq x \leq 2)$

| Example No. | Atomic Ratio of Ingredients (Cr/Mn/In/Sb) | Product | | |
|---|---|---|---|---|
| | | Composition by Analysis | $T_t(°C.)^a$ | $T_c(°C.)^a$ |
| VIII | 0/8.0/1.0/3.0 | | None | 276 |
| IX | 0.1/7.9/1.0/3.0 | | −128 | 268 |
| X | 1.2/7.8/1.0/3.0 | $Cr_{0.16}Mn_{5.03}In_{0.34}Sb_{3.0}$ | −65 | 260 |
| XI | 0.4/7.6/1.0/3.0 | $Cr_{0.32}Mn_{5.55}In_{0.34}Sb_{3.0}$ | 6 | 241 |
| XII | 0.8/7.2/1.0/3.0 | $Cr_{0.38}Mn_{5.95}In_{0.54}Sb_{3.0}$ | 28 | 236 |
| XIII | 2.0/6.0/1.0/3.0 | | 75 | 208 |

$^a T_t$ is lower ferromagnetic transition temperature; $T_c$ is Curie point.

EXAMPLES XIV–XVIII

The preparation of compositions from mixtures represented by $Mn_{7.2}Cr_{0.8}In_xSb_{4-x}$, where $x$ is in the range of 0 to 1 is illustrated in these examples. These mixtures contain the elements in the following atom percentages: Mn, 60; Cr, 6.7; In, 0–8.3; Sb, 25–33.3. The general procedure employed was as described in Example VIII and details of the reactants used and properties of the products are presented in Table IV. The magnetic properties of representative products are illustrated in Figure II. The X-ray patterns of the products are similar to that of Example I and indicate tetragonal structures of the $Cu_2Sb$-type.

Table IV $Cr_{0.8}Mn_{7.2}In_xSb_{4-x}$ $(0 \leq x \leq 1)$

| Example No. | Atomic Ratio of Ingredients (Cr/Mn/In/Sb) | Product | | |
|---|---|---|---|---|
| | | Composition by Analysis | $T_t(°C.)^a$ | $T_c(°C.)^a$ |
| XIV | 0.8/7.2/0/4.0 | | 112 | 200 |
| XV | 0.8/7.2/0.2/3.8 | $Cr_{0.62}Mn_{6.82}In_{0.11}Sb_{3.8}$ | 96 | 209 |
| XVI | 0.8/7.2/0.4/3.6 | | 57 | 226 |
| XVII | 0.8/7.2/0.6/3.4 | | 46 | 228 |
| XVIII | 0.8/7.2/1.0/3.0 | $Cr_{0.38}Mn_{5.95}In_{0.54}Sb_{3.0}$ | 28 | 236 |

$^a T_t$ is lower ferromagnetic transition temperature; $T_c$ is Curie point.

EXAMPLE XIX

This and the following examples through Example XXXV illustrate the effect of variations in chromium and/or vanadium content on the magnetic properties of products prepared from mixtures represented by the formula $Mn_aX_bSb_d$, where X is Cr and/or V.

A well-blended mixture of powdered manganese, antimony and chromium in the proportions on an atom basis, Mn, 7.2; Cr, 0.8; Sb, 4.0 (corresponding to $Mn_{1.8}Cr_{0.2}Sb$ or in atom percent, Mn, 60.0; Cr, 6.7; Sb, 33.3) was compressed into a cylindrical rod which was placed in a quartz tube. This tube was mounted vertically in a furnace with the upper end of the tube projecting out of the furnace. The upper end was attached to a manifold so that the sample could be evacuated with an oil pump or maintained under an atmosphere of argon as desired. The tube was successively evacuated and flushed with argon during approximately one hour while the temperature was raised to about 400° C. The sample was thereafter maintained under an atmosphere of argon while the temperature was raised during a 1.5-hour period to a maximum of 950° C. at which temperature the sample was molten. The temperature was maintained for approximately 21 hours and the sample was then slowly cooled to room temperature over a period of about 10 hours. The product, after removal from the quartz tube, was a metallic slug which, when fractured, revealed a crystalline interior. The crystals were plate-like in appearance and had a very high, silvery luster.

The product had a Curie temperature of 200° C. and a lower ferromagnetic transition temperature of 112° C.

The product gave an X-ray pattern indicating a tetragonal crystal structure of the $Cu_2Sb$-type.

EXAMPLES XX–XXII

These examples illustrate the effect of chromium content on the magnetic properties of products prepared from mixtures represented by the formula $Mn_{2-x}Cr_xSb$. For Examples XXI and XXII the general procedure of Example XIX was employed. For Example XX, the procedure described below for Examples XXIV–XXX was followed. The proportions of the ingredients used in these examples and the properties of the products are listed in Table V. For comparison, data relating to the product of Example XIX and to chromium-free $Mn_2Sb$ are included in Table V. It will be noted that the chromium-free composition is not a part of the present invention. The products indicated in the table contain the elements in the following atom percentages: Mn, 59.2–66.7; Cr, 0–7.5; Sb, 33.3; or, in other words, $x$, in the above formula, ranges from 0 to 0.225.

Table V $Cr_xMn_{2-x}Sb$ $(0 \leq x \leq 0.225)$

| Example No. | Atomic Ratio of Ingredients (Cr/Mn/Sb) | Product | |
|---|---|---|---|
| | | $T_t(°C.)^a$ | $T_c(°C.)^a$ |
| XIX [b] | 0.2/1.8/1 | 112 | 200 |
| XX | 0.225/1.775/1 | 140 | 250 |
| XXI [c] | 0.1/1.9/1 | −34 | 276 |
| XXII | 0.05/1.95/1 | −76 | 262 |
| ($Mn_2Sb$) | 0/2/1 | None | 276 |

$^a T_t$ is lower magnetic transition or exchange inversion temperature; $T_c$ is Curie point.
[b] The magnetic properties of this product are illustrated in Figure II.
[c] This material exhibited a $\sigma_a$ at temperature of maximum magnetization of 33 gauss cm.$^3$/g.

EXAMPLES XXIII–XXX

These examples illustrate the preparation of chromium-manganese antimonides within the following composition ranges (in atom percent): Mn, 54–85; Cr, 1.5–35; Sb, 10–33. The products were prepared by heating a well-blended mixture of the powdered elements in a quartz tube under an atmosphere of argon. The powdered mixture was heated rapidly until completely molten and then immediately allowed to cool. The proportions of the ingredients used and properties of the products are listed in Table VI.

Table VI
Cr-Mn-Sb Compositions

| Example No. | Proportion of Ingredients (atom cent) Cr/Mn/Sb | Properties of Product [a] | |
|---|---|---|---|
| | | $T_t$ (° C.) | R |
| XXIII [b] | 1.66/65.50/32.84 | −72 | 40 |
| XXIV | 5/75/20 | −170 | 5 |
| XXV | 5/85/10 | −50 | 33 |
| XXVI | 14/59/27 | 15 | 63 |
| XXVII | 15/67/18 | −5 | 15 |
| XXVIII | 22/68/10 | −44 | 7 |
| XXIX | 24/54/22 | 54 | 9 |
| XXX | 35/55/10 | −8 | 15 |

[a] $T_t$ is exchange inversion temperature; R is ratio of maximum saturation induction to saturation induction below $T_t$.
[b] This product was a large crystal prepared by slow withdrawal of a seed crystal from the melted composition. The product had a maximum saturation induction of 34 gauss cm.$^3$/g. (see Fig. III).

EXAMPLES XXXI–XXXIV

These examples illustrate the preparation of vanadium-manganese antimonides within the following composition ranges (in atom percent): Mn, 55–85; V, 2.5–35; Sb, 10–33.3. The products were prepared as described for Examples XXIV–XXX. The proportions of ingredients used and the properties of the products are listed in Table VII.

Table VII
V-Mn-Sb Compositions

| Example No. | Proportion of Ingredients (atom per cent) | | | Exchange Inversion Temperature, $T_t$, of Products (°C.) |
|---|---|---|---|---|
| | V | Mn | Sb | |
| XXXI [a] | 2.5 | 64.2 | 33.3 | −85 |
| XXXII | 5.0 | 85.0 | 10.0 | −145 |
| XXXIII | 14.0 | 59.0 | 17.0 | −38 |
| XXXIV | 35.0 | 55.0 | 10.0 | −47 |

[a] See Fig. III. This product had a maximum sigma value of 31.5 gauss cm.$^3$/g.

EXAMPLE XXXV

This example illustrates the preparation of chromium-vanadium-manganese antimonides. The preparation was carried out as described for Examples XIV–XXX, using manganese, chromium, vanadium and antimony in the proportions on an atom basis of Mn, 63.33; Cr, 1.67; V, 1.67; and Sb, 33.33, corresponding to $Mn_{1.9}Cr_{0.05}V_{0.05}Sb$. The product was a silvery crystalline solid having a Curie point of 245° C. Exchange inversion occurred at −40° C. and maximum saturation induction at 60° C.

EXAMPLE XXXVI

This example illustrates the preparation of a large crystal of chromium-indium-manganese antimonide. An intimate mixture of the elements in the proportions $Cr_{0.4}Mn_{7.6}In_{0.2}Sb_{3.8}$ (i.e., expressed in atom percent: Mn, 63.4; Cr, 3.3; In, 1.7; Sb, 31.6) was compressed into a cylinder which was placed in a small quartz tube tapered to a point at the lower end. This tube was left open at the top and was placed in a larger quartz tube which was evacuated and sealed. The tube was heated to melt the contents and a crystalline ingot was grown from the melt by lowering the sample through a fixed thermal gradient at a rate of 16 inches in 24 hours. The thermal gradient near the melting point of the sample (approximately 899° C.) was in the order of 35–40° C./in. with a maximum temperature of 1009° C.

After cooling, which required about 24 hours, the ingot so produced was removed from the quartz tube and cross-sectioned into several pieces. Portions of each piece were mounted, polished and examined with a metallographic microscope. Under polarized light, the first portion of the sample to solidify was found to contain no grain boundaries indicating that a single crystal had been obtained. However, under white light two minor phases were observed which were present to an extent of less than 1% of the main matrix phase. An X-ray diffraction pattern of this crystal showed that it was principally the chromium-indium-manganese antimonide. A few very faint X-ray lines were identified as belonging to indium and there was also some indication of the presence of traces of MnSb phase.

Analysis of a small portion of this single crystal was carried out by emission spectroscopy. A preliminary determination was first made and, with this as a basis, a standard prepared containing the elements in the indicated proportions. Using this standard for comparison, a corrected analysis for the single crystal fragment was obtained. The results showed the presence of Cr, Mn, In and Sb in the following proportions: $Cr_{0.49}Mn_{7.1}In_{0.16}Sb_{3.8}$.

Measurements of magnetic properties carried out on a portion of the crystal in powder form showed a lower ferromagnetic transition temperature of 24° C., a maximum saturation induction value at 60° C. and a Curie temperature of 232° C. Residual ferromagnetism below the lower ferromagnetic transition temperature was approximately 1/10 of the magnetization at 60° C.

Similar measurements made on another portion of the crystal in massive form showed that changes in temperature in the neighborhood of the lower ferromagnetic transition temperature produced very abrupt changes in magnetic response. For this reason, the compositions of this invention in single crystal form are particularly suited for applications in which a large and very rapid response to small temperature changes is desired.

EXAMPLE XXXVII

A mixture of 1.10 g. of Mn, 1.92 g. of Mo, and 1.22 g. of Sb, all in finely powdered form, was prepared and compressed into a pellet 0.5" in diameter. This pellet contained the three elements in the proportions in atom percent: Mn, 40; Mo, 40; Sb, 20. The pellet was placed in an alumina crucible which in turn was placed in a quartz tube connected to a high vacuum system. The system was purged with purified argon, then evacuated, and the pellet was degassed by heating at 300° C. for approximately 16 hours under high vacuum (ca. 1 micron pressure). Purified argon was then admitted to the system to a pressure of about 1 atmosphere and the pellet was heated to 1100° C. The pellet was maintained at this temperature for 30 minutes and allowed to cool slowly to room temperature during about 4 hours. The product was a bright metallic button containing large crystals. Magnetization of the product was determined over the temperature range of −250° C. to 0° C. Saturation per gram was 14.7 gauss cm.$^3$/g. at −250° C. and 23.5 gauss cm.$^3$/g. at −110° C. At 0° C., saturation per gram was 19.6 gauss cm.$^3$/g.

EXAMPLE XXXVIII

Powdered manganese-niobium alloy in an amount equivalent to 1.49 g. of Mn and 2.86 g. of Nb was mixed with 1.28 g. of antimony and the mixture was pressed into a pellet 0.5" in diameter. The pellet contained the three elements in the proportions in atom percent: Mn, 40; Nb, 45; Sb, 15. This pellet was degassed by heating in vacuum as described for the manganese-molybdenum-antimony composition and finally heated at 1200° C. for 10 minutes. A porous sintered object was produced. Saturation per gram of this object was 2.8 gauss cm.$^3$/g. at −250° C., 3.5 gauss cm.$^3$/g. at −115° C. and 2.8 gauss cm.$^3$/g. at 0° C.

UTILITY

Within the temperature range where ferromagnetism is exhibited, the compositions of this invention can be used in any of the conventional applications for ferromagnetic materials for which their properties are suitable, e.g., electromagnets, high frequency coil cores, information and memory storage elements.

The unique magnetic behavior of many compositions of this invention qualifies them for numerous applications unconventional in the magnetic art. For example, these compositions can be employed in devices such as motors, switches, and the like, in which a pivoted element is caused to move in a magnetic field as a result of changes in temperature of the composition. The compositions are also useful in temperature responsive inductors and generators and can be employed in the formation of images. In all these uses, the compositions function to convert energy from one form to another and devices based thereon include means for applying a form of energy to the composition and means for utilizing the output from the composition. For some applications, means will also be provided for controllably magnetizing and demagnetizing the composition.

The sharp and considerable increase in magnetization caused by an increase in temperature renders certain materials useful as temperature compensators in devices based on conventional magnetic materials where sagging of magnetic properties with increased temperature is functionally deleterious. These novel compositions may also be used in temperature-activated control devices and in fabrication of circuit components whose response to changes in temperature opposes that of components employing conventional materials. By proper combinations of these materials with conventional magnetic materials, composite products can be made exhibiting magnetizations which pass through deep minima followed by very sharp maxima. Such behavior has not previously been obtainable and possesses obvious utility in novel temperature-sensitive circuit elements.

To illustrate the applications of ferromagnetic materials of this invention, a thermomagnetic generator and a solar motor are described which depend for their operation on changes in magnetization produced by temperature changes in the region of the lower ferromagnetic transition temperature. Devices for the interconversion and control of various forms of energy in which the present compositions can be employed are more fully set forth in my application Serial No. 181,629, filed on even date herewith.

EXAMPLE A

This example illustrates the use of a manganese-chromium-indium-antimonide in the construction of a thermomagnetic generator. A flat disk ½" in diameter and 0.045" thick was prepared from the product of Example XVII by pressing in a mold under a pressure of about 30,000 p.s.i. at room temperature. This disk was placed across and in contact with the poles of a magnet having a field strength of about 1000 gauss. A coil consisting of 300 turns of No. 44 enameled copper wire was wrapped around the magnet and connected to a microvolt amplifier which in turn was connected to a recorder. The disk was illuminated with a beam of light produced by a microscope illuminator having a 108-watt lamp. By means of a manually operated shutter, periods of illumination about 10 seconds in length were alternated with periods of about equal duration during which the light beam was interrupted. Variations in voltage occurred corresponding to the variations in light intensity and associated traversal of exchange inversion.

EXAMPLE B

This example illustrates the use of a manganese-chromium-indium antimonide in the construction of a solar motor operating on a heating and cooling cycle in the region of the lower ferromagnetic transition temperature. This motor possesses an advantage over similar motors constructed from conventional magnetic materials in that the magnetic material can be selected to have a sharp transition in a desired temperature range thereby permitting most efficient use of the heat available.

A disk approximately 2" in diameter was carefully cut from a thin mica sheet and a small hole drilled through the center. Through this hole a thin Pyrex tube was passed perpendicular to the plane of the disk to serve as a bearing. The disk was fastened to this tube with cement. An axle was placed within the tube and supported at the ends.

Particles of product from Example XII were adhered at the edge of each face of the wheel in a band ⅛" wide by means of silver paste of the air-drying type. After thorough drying, the rim of the wheel was coated with soot from a small candle to enhance heat absorption.

The stator of the motor was a magnet having a field strength of 4800 gauss with facing pole pieces approximately ¾" in diameter and ¾" apart. The axle was mounted in a horizontal position parallel to and 1.5" away from the center line of the pole pieces with the plane of the mica wheel centered in the gap. A beam of light from a lamp consuming 6 amperes at 6 volts was focused so that an image of the filament was produced on each side of the rim of the wheel at a position just above the magnet poles. When the light was turned on, the wheel rotated steadily making a complete revolution in slightly less than one minute. This motor readily raised a mass of 255 mg. at a distance of 2 cm. from the center of rotation.

In place of the lamp, sunlight was focused onto the wheel using a spherical lens of 8.5 mm. principal focal length and 3.25" in diameter. In order to prevent overheating, the image of the sun was defocused somewhat and only about half of the area of the spot impinged on the wheel. Under these conditions, the motor turned readily and raised the 255 mg. weight in about 18 seconds.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A ferromagnetic composition consisting essentially of at least two transition elements selected from the class consisting of vanadium, chromium, manganese, niobium, molybdenum, tantalum, tungsten and rhenium, of which at least one such transition element is selected from the class consisting of vanadium, chromium and manganese, said transition elements being present in a total amount of from 35 to 95 atom percent, each of said transition elements being present in an amount of at least 0.1 atom percent, based on the total composition, and at least one element selected from the class consisting of arsenic and antimony in an amount of from 5 to 40 atom percent.

2. A ferromagnetic composition consisting essentially of at least two transition elements selected from the class consisting of vanadium, chromium, manganese, niobium, molybdenum, tantalum, tungsten and rhenium, of which at least one such transition element is selected from the class consisting of vanadium, chromium and manganese, said transition elements being present in a total amount of from 35 to 95 atom percent, each of said transition elements being present in an amount of at least 0.1 atom percent, based on the total composition, at least one element selected from the class consisting of arsenic and antimony in an amount of from 5 to 40 atom percent and from zero up to and including 30 atom percent of at least one element selected from the group consisting of bismuth, cadmium, gallium, indium, lead, thallium, tin, zirconium, scandium, yttrium, magnesium and zinc.

3. A ferromagnetic composition consisting essentially of at least two transition elements selected from the class consisting of vanadium, chromium, manganese, niobium, molybdenum, tantalum, tungsten and rhenium, of which at least one such transition element is selected from the class consisting of vanadium, chromium and manganese, said transition elements being present in a total amount of from 35 to 95 atom percent, each of said transition elements being present in an amount of at least 0.1 atom percent, based on the total composition, at least one element selected from the class consisting of arsenic and antimony in an amount of from 5 to 40 atom percent and from zero up to and including 30 atom percent of at least one element selected from the group consisting of bismuth, cadmium, gallium, indium, lead, thallium, tin, zirconium, scandium, yttrium, magnesium and zinc, and exhibiting a maximum saturation induction in a restricted range of temperature and a substantially lower saturation induction at temperatures both below and above said range.

4. A ferromagnetic composition exhibiting a tetragonal crystal structure of the $Cu_2Sb$-type consisting essentially of 5 to 40 atom percent of antimony, from 35 to 91.9 atom percent manganese, from 0.1 to 38.5 atom percent of chromium, and from zero up to and including 30 atom percent of at least one element selected from the class consisting of bismuth, cadmium, gallium, indium, lead, thallium, tin, zirconium, scandium, yttrium, magnesium, and zinc.

5. A ferromagnetic composition exhibiting a tetragonal crystal structure of the $Cu_2Sb$-type consisting essentially of 5 to 40 atom percent of antimony, from 35 to 91.9 atom percent manganese, from 0.1 to 38.5 atom percent of vanadium, and from zero up to and including 30 atom percent of at least one element selected from the class consisting of bismuth, cadmium, gallium, indium, lead, thallium, tin, zirconium, scandium, yttrium, magnesium, and zinc.

6. A ferromagnetic composition consisting essentially of 5 to 35 atom percent antimony, 25 to 75 atom percent manganese, 0.1 to 50 atom percent molybdenum, and from zero up to and including 30 atom percent of at least one element selected from the class consisting of bismuth, cadmium, gallium, indium, lead, thallium, tin, zirconium, scandium, yttrium, magnesium, and zinc.

7. A ferromagnetic composition consisting essentially of 5 to 35 atom percent antimony, 25 to 75 atom percent manganese, 0.1 to 50 atom percent niobium, and from zero up to and including 30 atom percent of at least one element selected from the class consisting of bismuth, cadmium, gallium, indium, lead, thallium, tin, zirconium, scandium, yttrium, magnesium, and zinc.

8. A ferromagnetic composition of the formula $$Mn_{2-x}X_xSb$$

where X is a member of the class consisting of chromium, vanadium and mixtures thereof, and $x$ is 0.003–0.41, said composition being further characterized by having a tetragonal structure of the $Cu_2Sb$-type.

9. A ferromagnetic composition of the formula $$Mn_{2-x}X_xSb$$

where X is a member of the class consisting of chromium, vanadium and mixtures thereof, and $x$ is 0.015–0.25, said composition being further characterized by having a tetragonal structure of the $Cu_2Sb$-type.

10. A ferromagnetic composition exhibiting a tetragonal crystal structure of the $Cu_2Sb$-type, consisting essentially of 5 to 35 atom percent of antimony, 35 to 70 atom percent of manganese, 0.8 to 25 atom percent chromium, and from zero up to and including 30 atom percent of at least one element selected from the class consisting of bismuth, cadmium, gallium, indium, lead, thallium, tin, zirconium, scandium, yttrium, magnesium, and zinc.

11. A ferromagnetic composition exhibiting a tetragonal crystal structure of the $Cu_2Sb$-type, consisting essentially of 5 to 35 atom percent of antimony, 35 to 70 atom percent of manganese, 0.8 to 25 atom percent vanadium, and from zero up to and including 30 atom percent of at least one element selected from the class consisting of bismuth, cadmium, gallium, indium, lead, thallium, tin, zirconium, scandium, yttrium, magnesium, and zinc.

12. A ferromagnetic composition exhibiting a tetragonal crystal structure of the $Cu_2Sb$-type, consisting essentially of 20 atom percent of antimony, 75 atom percent manganese, and 5 atom percent of chromium.

13. A ferromagnetic composition exhibiting a tetragonal crystal structure of the $Cu_2Sb$-type, consisting essentially of 22 atom percent of antimony, 54 atom percent of manganese, and 24 atom percent of chromium.

14. A ferromagnetic composition exhibiting a tetragonal crystal structure of the $Cu_2Sb$-type, consisting essentially of 10 atom percent of antimony, 55 atom percent manganese, and 35 atom percent of vanadium.

15. A ferromagnetic composition consisting essentially of 20 atom percent of antimony, 40 atom percent of manganese, and 40 atom percent molybdenum.

16. Process for preparing a ferromagnetic composition of claim 1 which comprises heating together at a temperature of from 600° to 1500° C. at least two transition elements selected from the class consisting of vanadium, chromium, manganese, niobium, molybdenum, tantalum, tungsten and rhenium, of which at least one such transition element is selected from the class consisting of vanadium, chromium and manganese, said transition elements being present in a total amount of from 35 to 95 atom percent, each of said transition elements being present in an amount of at least 0.1 atom percent, based on the total composition, and at least one element selected from the class consisting of arsenic and antimony in an amount of from 5 to 40 atom percent, and cooling the resulting composition.

17. Process for preparing a ferromagnetic composition of claim 1 which comprises heating together at a temperature of from 600° to 1500° C. at least two transition elements selected from the class consisting of vanadium, chromium, manganese, niobium, molybdenum, tantalum, tungsten and rhenium, of which at least one such transition element is selected from the class consisting of vanadium, chromium and manganese, said transition elements being present in a total amount of from 35 to 95 atom percent, each of said transition elements being present in an amount of at least 0.1 atom percent, based on the total composition, at least one element selected from the class consisting of arsenic and antimony in an amount of from 5 to 40 atom percent, and from zero up to and including 30 atom percent of at least one element selected from the group consisting of bismuth, cadmium, gallium, indium, lead, thallium, tin, zirconium, scandium, yttrium, magnesium and zinc, and cooling the resulting composition.

No references cited.